(12) United States Patent
Feld et al.

(10) Patent No.: US 11,907,541 B2
(45) Date of Patent: Feb. 20, 2024

(54) ADAPTIVE READ PREFETCH TO REDUCE HOST LATENCY AND INCREASE BANDWIDTH FOR SEQUENTIAL READ STREAMS

(71) Applicant: Dell Products L.P., Round Rock, TX (US)

(72) Inventors: Andrew Feld, Keene, NH (US); Philippe Armangau, Acton, MA (US); Christopher A. Seibel, Walpole, MA (US); Christopher Jones, Plainville, MA (US)

(73) Assignee: Dell Products L.P., Round Rock, TX (US)

( * ) Notice: Subject to any disclaimer, the term of this patent is extended or adjusted under 35 U.S.C. 154(b) by 55 days.

(21) Appl. No.: 17/715,219

(22) Filed: Apr. 7, 2022

(65) Prior Publication Data

US 2023/0325090 A1 Oct. 12, 2023

(51) Int. Cl.
*G06F 12/00* (2006.01)
*G06F 3/06* (2006.01)
*G06F 12/0862* (2016.01)
*G06F 12/123* (2016.01)

(52) U.S. Cl.
CPC .......... *G06F 3/0613* (2013.01); *G06F 3/0619* (2013.01); *G06F 3/0659* (2013.01); *G06F 3/0679* (2013.01); *G06F 12/0862* (2013.01); *G06F 12/123* (2013.01)

(58) Field of Classification Search
None
See application file for complete search history.

(56) References Cited

U.S. PATENT DOCUMENTS

| 5,761,464 A | 6/1998 | Hopkins |
| 6,721,870 B1 | 4/2004 | Yochai et al. |
| 7,565,494 B1 | 7/2009 | Todd et al. |
| 8,429,351 B1 | 4/2013 | Yu et al. |
| 10,871,902 B2 | 12/2020 | Dias et al. |
| 11,150,826 B2 | 10/2021 | Madan et al. |
| 11,237,964 B2 | 2/2022 | Kucherov et al. |
| 2011/0173397 A1* | 7/2011 | Boyle ................ G06F 12/0862 711/E12.001 |

* cited by examiner

*Primary Examiner* — Daniel D Tsui
(74) *Attorney, Agent, or Firm* — BainwoodHuang (57) ABSTRACT

Techniques for providing an adaptive approach to prefetching data for sequential read streams in a storage system. The techniques can include performing prefetch operations for a sequential read stream in accordance with a prefetch distance and a prefetch size, counting or otherwise keeping track of occurrences of failure scenarios in the prefetch operations while servicing the sequential read stream, and modifying or adjusting one of the prefetch distance and the prefetch size based on the occurrences of the respective failure scenarios. In this way, host input/output (IO) latency can be reduced, and IO bandwidth can be increased, in the servicing of sequential read streams by the storage system.

18 Claims, 4 Drawing Sheets

ADAPTIVE READ PREFETCH TO REDUCE HOST LATENCY AND INCREASE BANDWIDTH FOR SEQUENTIAL READ STREAMS

BACKGROUND

Storage systems include storage processing circuitry and arrays of storage devices such as solid-state drives (SSDs), hard disk drives (HDDs), optical drives, and so on. The storage processing circuitry services storage input/output (IO) requests generated by host computers communicably couplable to the storage systems. The storage IO requests (e.g., read requests, write requests) specify data blocks, data pages, data files, or other data elements to be read from or written to volumes (VOLs), logical units (LUNs), filesystems, or other storage objects maintained on the storage devices. In an effort to reduce host IO latency and increase IO bandwidth for sequential read streams, the storage processing circuitry anticipates host-generated read requests (also referred to herein as "host read(s)") for data residing at sequential addresses in a given address space and issues prefetch requests for the anticipated data. The prefetched data are stored in a cache from which subsequent host reads in the sequential read streams can be serviced.

SUMMARY

During a prefetch operation, storage processing circuitry can read increments of anticipated data (also referred to herein as "prefetch increment(s)") from segments of storage objects such as extents of volumes. Each prefetch increment can begin at a distance (also referred to herein as the "prefetch distance") that specifies how far ahead, in terms of addresses, a prefetch operation will reference a storage location of an extent compared to a prior host read of the extent, in which the prior host read is one of several host reads in a sequential read stream. Performing prefetch operations for a sequential read stream can lead to failure scenarios, however, particularly when the prefetch distance is fixed. Such failure scenarios can be due to various factors affecting the performance of a storage system including cache pressure, IO load, background tasks, and so on.

For example, in a first failure scenario, performing prefetch operations with a fixed prefetch distance can result in a host read that effectively "catches up" with a prefetch operation. In this first failure scenario (referred to herein as the "host-fast scenario"), the host read can be directed to data residing at the same address from which data is actively being prefetched, thereby making the prefetch operation superfluous. Such a superfluous prefetch operation can increase host IO latency by blocking or preventing a host read from being serviced, as well as increase the use of storage system resources and/or drive bandwidth. Further, in a second failure scenario, maintaining a fixed prefetch distance can result in prefetched data being evicted from a cache without first being accessed to service a host read. In this second failure scenario (referred to herein as the "wasted-prefetch scenario"), the use of drive bandwidth can be further increased due to anticipated data being prefetched from a storage drive to the cache, evicted from the cache before being accessed to service a host read, and accessed again from the storage drive to ultimately service the host read.

Techniques are disclosed herein for providing an adaptive approach to prefetching data for sequential read streams in a storage system. In the disclosed techniques, an overall occurrence of failure scenarios in prefetch operations can be reduced by dynamically modifying or adjusting a prefetch distance or a prefetch size based on occurrences of the respective failure scenarios. In certain embodiments, the failure scenarios can include the host-fast scenario and the wasted-prefetch scenario described herein. The storage system can include storage processing circuitry, an IO transaction cache, and a storage device array configured to maintain at least one storage object such as a volume. In response to receiving, at the storage system, host-generated read requests ("host reads") for data stored on an extent of the volume, the storage processing circuitry can detect that the host reads are part of a sequential read stream. Based on an average IO size of the host reads, the storage processing circuitry can determine an initial value of the prefetch distance between a predetermined minimum distance value and a predetermined maximum distance value, as well as determine an initial value of the prefetch size between a predetermined minimum size value and a predetermined maximum size value. The prefetch distance can specify how far ahead, in terms of addresses, a prefetch operation will reference a storage location of the extent compared to a prior host read of the extent. The prefetch size, which corresponds to the size of a prefetch increment, can specify how much anticipated data will be prefetched starting at an address of the storage location referenced by the prefetch operation. Having determined initial values for the prefetch distance and the prefetch size, the storage processing circuitry can perform prefetch operations for the sequential read stream and store prefetched data in the IO transaction cache. The storage processing circuitry can also count or otherwise keep track of occurrences of failure scenarios in the prefetch operations (such as the host-fast scenario and the wasted-prefetch scenario) while servicing the sequential read stream.

If the host-fast scenario is determined to occur at least once while servicing the sequential read stream, then the storage processing circuitry can determine whether a current value of the prefetch distance is less than the predetermined maximum distance value or greater than or equal to the predetermined maximum distance value, as well as whether a current value of the prefetch size is greater than the predetermined minimum size value or less than or equal to the predetermined minimum size value. Based on these determinations, the storage processing circuitry can reduce occurrences of the host-fast scenario by increasing the value of the prefetch distance if its current value is less than the predetermined maximum distance value or decreasing the value of the prefetch size if the current value of the prefetch distance is greater than or equal to the predetermined maximum distance value and the current value of the prefetch size is greater than the predetermined minimum size value. If the wasted-prefetch scenario is determined to occur at least once (or preferably more than once) while servicing the sequential read stream, then the storage processing circuitry can further determine whether the current value of the prefetch distance is greater than the predetermined minimum distance value or less than or equal to the predetermined minimum distance value. Based on these further determinations, the storage processing circuitry can reduce occurrences of the wasted-prefetch scenario by decreasing the value of the prefetch distance if its current value is determined to be greater than the predetermined minimum distance value. In this way, host IO latency can be reduced, and IO bandwidth can be increased, in the servicing of sequential read streams by the storage system.

In certain embodiments, a method of prefetching data for a sequential read stream includes performing prefetch operations for a sequential read stream in accordance with a prefetch distance and a prefetch size, keeping track of occurrences of failure scenarios in the prefetch operations while servicing the sequential read stream, and dynamically adjusting one of the prefetch distance and the prefetch size based on the occurrences of failure scenarios in the prefetch operations.

In certain arrangements, the method further includes receiving a plurality of read requests for data stored on a storage object and determining that the plurality of read requests are part of the sequential read stream.

In certain arrangements, the plurality of read requests reference addresses of the storage object, and the method further includes storing information pertaining to the addresses referenced by the plurality of read requests as entries in a history array and scanning the entries of the history array to determine that the plurality of read requests are part of the sequential read stream.

In certain arrangements, the method further includes determining an initial value of a prefetch size based on an average input/output (IO) size of the plurality of read requests, in which the initial value of the prefetch size is greater than a predetermined minimum size value.

In certain arrangements, the method further includes determining an initial value of a prefetch distance based on the average IO size of the plurality of read requests, in which the initial value of the prefetch distance is between a predetermined minimum distance value and a predetermined maximum distance value.

In certain arrangements, the failure scenarios include a host-fast scenario, which includes a respective read request being directed to data residing at the same address from which data is actively being prefetched, and the method further includes determining whether the host-fast scenario occurs at least once while servicing the sequential read stream.

In certain arrangements, the method further includes, in response to determining that the host-fast scenario occurs at least once while servicing the sequential read stream, determining that a current value of the prefetch distance is less than the predetermined maximum distance value, and increasing the value of the prefetch distance to reduce occurrences of the host-fast scenario.

In certain arrangements, the method further includes, in response to determining that the host-fast scenario occurs at least once while servicing the sequential read stream, determining that a current value of the prefetch distance is greater than or equal to the predetermined maximum distance value, determining that a current value of the prefetch size is greater than the predetermined minimum size value, and decreasing the value of the prefetch size to reduce occurrences of the host-fast scenario.

In certain arrangements, the failure scenarios include a wasted-prefetch scenario, which includes prefetched data being evicted from a cache memory before being accessed to service a respective read request, and the method further includes determining whether the wasted-prefetch scenario occurs at least once while servicing the sequential read stream.

In certain arrangements, the method further includes, in response to determining that the wasted-prefetch scenario occurs at least once while servicing the sequential read stream, determining that a current value of the prefetch distance is greater than the predetermined minimum distance value, and decreasing the value of the prefetch distance to reduce occurrences of the wasted-prefetch scenario.

In certain arrangements, the method further includes storing prefetched data elements in a cache memory.

In certain arrangements, each prefetched data element stored in the cache memory has a plurality of associated flags including a PREFETCHED flag and a REPROMOTED flag, and the method further includes, for each prefetched data element stored in the cache memory, setting its associated PREFETCHED flag, clearing its associated REPROMOTED flag, and placing an entry for the prefetched data element in a least-recently-used (LRU) queue.

In certain arrangements, the method further includes, in response to the prefetched data element being accessed to service a read request, clearing its associated PREFETCHED flag and moving the entry for the prefetched data element to a head of the LRU queue.

In certain arrangements, the method further includes, in response to the entry for the prefetched data element reaching the head of the LRU queue, removing the entry for the prefetched data element from the LRU queue and evicting the prefetched data element from the cache memory.

In certain arrangements, the method further includes, in response to the entry for the prefetched data element reaching the head of the LRU queue, determining that the REPROMOTED flag associated with the prefetched data element is cleared, setting the REPROMOTED flag associated with the prefetched data element, moving the entry for the prefetched data element to a tail of the LRU queue, retaining the prefetched data element in the cache memory, and increasing a count for a wasted-prefetch scenario, in which the wasted-prefetch scenario includes prefetched data being evicted from the cache memory before being accessed to service a respective read request.

In certain arrangements, the method further includes, in response to the entry for the prefetched data element reaching the head of the LRU queue, determining that the REPROMOTED flag associated with the prefetched data element is set, removing the entry for the prefetched data element from the LRU queue, evicting the prefetched data element from the cache memory, and increasing the count for the wasted-prefetch scenario.

In certain embodiments, a system for prefetching data for a sequential read stream includes a main memory and processing circuitry configured to execute program instructions out of the main memory to perform prefetch operations for a sequential read stream in accordance with a prefetch distance and a prefetch size, to keep track of occurrences of failure scenarios in the prefetch operations while servicing the sequential read stream, and to dynamically adjust one of the prefetch distance and the prefetch size based on the occurrences of failure scenarios in the prefetch operations.

In certain arrangements, the system further includes a history array, and the processing circuitry is further configured to execute the program instructions out of the main memory to receive a plurality of read requests for data stored on a storage object, to store information pertaining to addresses referenced by the plurality of read requests as entries in the history array, and to scan the entries of the history array to determine that the plurality of read requests are part of the sequential read stream.

In certain arrangements, the system further includes a cache memory, the failure scenarios include a host-fast scenario and a wasted-prefetch scenario, and the processing circuitry is further configured to execute the program instructions out of the main memory to receive a plurality of read requests for data stored on a storage object, to determine that the plurality of read requests are part of the sequential read stream, to determine an initial value of a prefetch size based on an average input/output (IO) size of the plurality of read requests, and to determine an initial value of a prefetch distance based on the average IO size of the plurality of read requests. The host-fast scenario includes a respective read request being directed to data residing at the same address from which data is actively being prefetched, and the wasted-prefetch scenario includes prefetched data being evicted from the cache memory before being accessed to service a respective read request.

In certain embodiments, a computer program product includes a set of non-transitory, computer-readable media having instructions that, when executed by processing circuitry of a computerized apparatus, cause the processing circuitry to perform a method of prefetching data for a sequential read stream, the method including performing prefetch operations for a sequential read stream in accordance with a prefetch distance and a prefetch size, keeping track of occurrences of failure scenarios in the prefetch operations while servicing the sequential read stream, and dynamically adjusting one of the prefetch distance and the prefetch size based on the occurrences of failure scenarios in the prefetch operations.

Other features, functions, and aspects of the present disclosure will be evident from the Detailed Description that follows.

BRIEF DESCRIPTION OF THE DRAWINGS

The foregoing and other objects, features, and advantages will be apparent from the following description of embodiments of the present disclosure, as illustrated in the accompanying drawings, in which like reference characters refer to the same parts throughout the different views.

DETAILED DESCRIPTION

Techniques are disclosed herein for providing an adaptive approach to prefetching data for sequential read streams in a storage system. The disclosed techniques can include performing prefetch operations for a sequential read stream in accordance with a prefetch distance and a prefetch size, counting or otherwise keeping track of occurrences of failure scenarios in the prefetch operations while servicing the sequential read stream, and modifying or adjusting one of the prefetch distance and the prefetch size based on the occurrences of the respective failure scenarios. In this way, host input/output (IO) latency can be reduced, and IO bandwidth can be increased, in the servicing of sequential read streams by the storage system.

Figure 1:
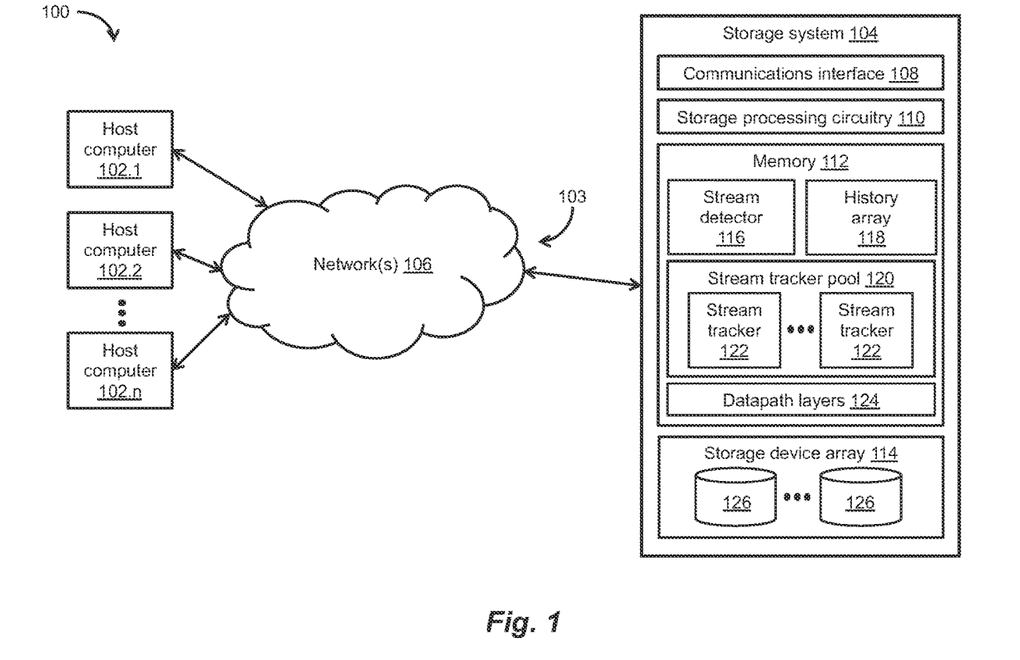
FIG. 1 is a block diagram of an exemplary storage environment, in which techniques can be practiced for providing an adaptive approach to prefetching data for sequential read streams in a storage system.

FIG. 1 depicts an illustrative embodiment of an exemplary storage environment 100 for providing an adaptive approach to prefetching data for sequential read streams. As shown in FIG. 1, the storage environment 100 can include a plurality of host computers 102.1, 102.2, . . . , 102.$n$ communicably coupled to a storage system 104 by a communications medium 103, which includes at least one network 106. For example, each of the plurality of host computers 102.1, . . . , 102.$n$ can be configured as a file server, a web server, an email server, or any other suitable server computer, client computer, or computerized device. The host computers 102.1, . . . , 102.$n$ can be further configured to provide, over the network(s) 106, storage input/output (IO) requests (e.g., small computer system interface (SCSI) commands, network filesystem (NFS) commands) to the storage system 104. Such storage IO requests (e.g., read requests, write requests) can direct the storage system 104 to read and/or write data blocks, data pages, data files, and/or any other suitable data elements from/to storage objects such as volumes (VOLs), logical units (LUNs), filesystems, and/or any other suitable storage objects, which can be maintained on a storage device array 114. The storage system 104 can be configured as a standalone storage system including a single storage appliance or node, an active-active storage system including two (2) storage appliances or nodes, a clustered storage system, a cloud-based storage system, or any other suitable storage system.

The communications medium 103 can be configured to interconnect the host computers 102.1, . . . , 102.$n$ with the storage system 104 to enable them to communicate and exchange data and control signaling. As shown in FIG. 1, the communications medium 103 is illustrated as a "cloud" to represent different network topologies such as a storage area network (SAN) topology, a network-attached storage (NAS) topology, a direct-attached storage (DAS) topology, a local area network (LAN) topology, a metropolitan area network (MAN) topology, a wide area network (WAN) topology, or any suitable combination thereof. As such, the communications medium 103 can include copper-based data communications devices and cabling, fiber optic devices and cabling, wireless devices, and so on, or any suitable combination thereof.

As shown in FIG. 1, the storage system 104 can include a communications interface 108, storage processing circuitry 110, a memory 112, and the storage device array 114. The communications interface 108 can include an Ethernet interface, an InfiniBand interface, a Fiber Channel interface, or any other suitable communications interface. The communications interface 108 can further include SCSI target adapters, network interface adapters, or any other suitable adapters for converting electronic, optical, and/or wireless signals received over the network(s) 106 to a form suitable for use by the storage processing circuitry 110. The storage processing circuitry 110 can be configured to process storage IO requests (e.g., read requests, write requests) issued by the host computers 102.1, . . . , 102.$n$ and store host data in a redundant array of independent disk (RAID) environment implemented on the storage device array 114. The storage array 114 can include a plurality of storage devices 126 such as solid-state drives (SSDs), hard disk drives (HDDs), optical drives, flash drives, hybrid drives, or any other suitable drives. The storage devices 126 can be configured to store VOLs, LUNs, filesystems, or any other suitable storage objects for hosting data storage of host applications (e.g., file applications, web applications, email applications) executing on one or more of the host computers 102.1, . . . , 102.*n*.

The memory 112 can include persistent memory (e.g., flash memory, magnetic memory) and non-persistent cache memory (e.g., dynamic random-access memory (DRAM), static random-access memory (SRAM)), as well as an operating system (OS) such as the Linux operating system (OS), Unix OS, Windows OS, or any other suitable operating system. The memory 112 can be configured to store a variety of software constructs realized in the form of specialized code and data including a stream detector 116, a history array 118, a stream tracker pool 120, and a plurality of datapath layers 124. Such specialized code can be executed by the storage processing circuitry 110 to carry out the various techniques and/or methods disclosed herein.

The stream detector 116 can be configured to detect or determine whether a plurality of host-generated read requests (also referred to herein as "host read(s)") generated by one or more of the host computers 102.1, . . . , 102.*n* are part of a sequential read stream. Such host reads can be generated to access data stored on an extent of a volume maintained on one or more of the storage devices 126 and be configured to reference addresses of storage locations of the extent. The history array 118 can be configured to include a plurality of entries for maintaining a history of the most recent "M" (e.g., M=16) data accesses made to service the host reads. In one embodiment, the history array 118 can be configured to maintain a history of the most recent sixteen (16) data access for servicing host reads having an average IO size of 32 kb or any other suitable value. Each entry of the history array 118 can include, for a respective host read, information pertaining to an address of a storage location of an extent referenced by the respective host read. By scanning the information stored in the entries in the history array 118 and determining that the addresses of the storage locations referenced by the host reads are sequential, the stream detector 116 can detect or determine that the host reads are in actuality part of a sequential read stream.

The stream tracker pool 120 can be configured to accommodate a plurality of stream trackers 122 for managing prefetch functionality of the storage system 104 in the service of active sequential read streams. Each stream tracker 122 can be configured to count or otherwise keep track of occurrences of failure scenarios in prefetch operations performed by the storage system 104 while servicing the active sequential read streams, and to dynamically modify or adjust a prefetch distance or a prefetch size based on the occurrences of the respective failure scenarios. To facilitate its management of prefetch functionality, each stream tracker 122 can have an associated object configured to store the prefetch distance and the prefetch size, as well as the time when a prefetch request was issued, the state of a current or most recent prefetch operation (e.g., NOT_STARTED, IN_FLIGHT, COMPLETE), the time when the prefetch operation was started, the storage location of an extent where the prefetch operation is being or was performed, and so on.

Figure 2:
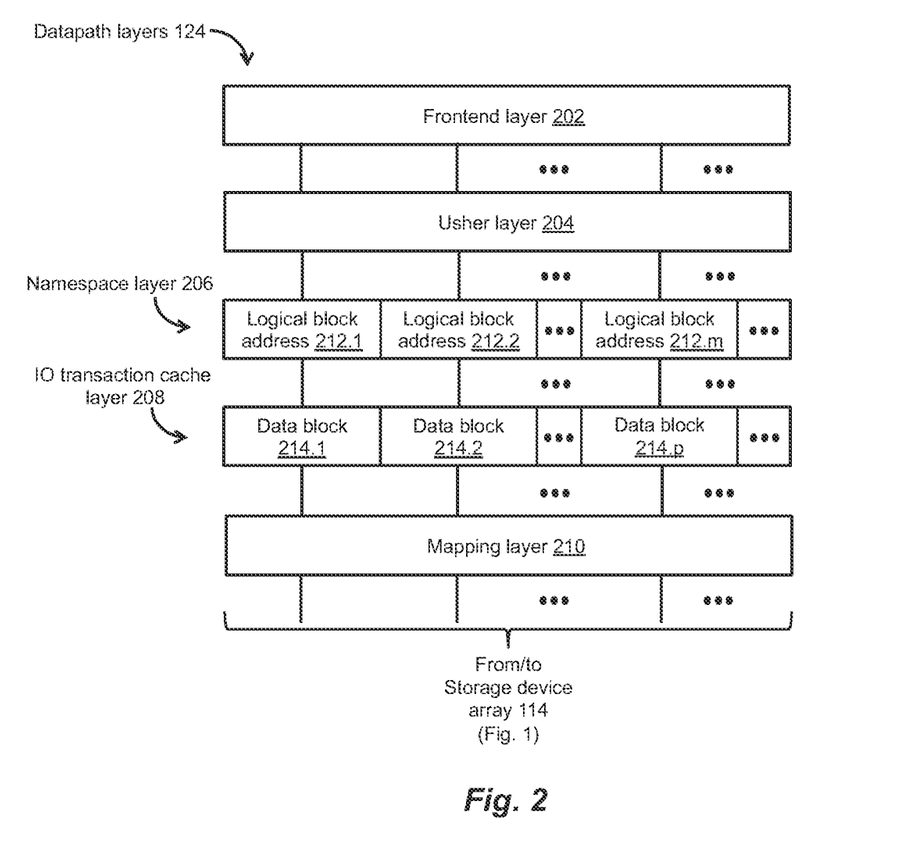
FIG. 2 is a block diagram of exemplary datapath layers included in the storage system of FIG. 1, in which the datapath layers include a frontend layer, an usher layer, a namespace layer, an IO transaction cache layer, and a mapping layer.

As shown in FIG. 2, the datapath layers 124 can include a frontend layer 202, an usher layer 204, a namespace layer 206, an IO transaction cache layer 208, and a mapping layer 210. The frontend layer 202 can be configured to receive host-generated read requests ("host reads"), identify storage objects (e.g., VOLs, LUNs, filesystems) associated with the host reads, route the host reads along IO paths through the datapath layers 124, and generate prefetch requests. The usher layer 204 can be configured to implement queues for the host reads, each of which can include Quality of Service (QoS) features, as well as issue the prefetch requests generated at the frontend layer 202. The namespace layer 206 can be configured to organize the storage objects, and to track logical block addresses (LBAs) of the of the storage objects such as LBAs 212.1, 212.2, . . . , 212.*m*. For example, if a storage object such as a volume (VOL) includes an extent having a maximum size of 32 megabytes (Mb), then the namespace layer 206 can be configured to provide a logical address range of 32 Mb to accommodate the extent. The IO transaction cache layer 208 can be configured to store or cache, persistently and at least temporarily, data elements for the host reads, such as data blocks 214.1, 214.2, . . . , 214.*p*, subsequent to the data elements being read or prefetched from logical addresses of the storage objects on the storage device array 114. In one embodiment, the IO transaction cache layer 208 can be disposed above the mapping layer 210. Because accessing data from cache memory is faster than accessing the data from a physical storage device, the IO transaction cache layer 208 can reduce host IO latency by storing or caching various amounts of data (e.g., 4*k* data blocks) in anticipation of host reads being serviced in a sequential read stream. The mapping layer 210 can be configured to map the logical addresses of the storage objects to their corresponding physical locations on the storage device array 114.

In the context of the storage processing circuitry 110 being configured to execute specialized code (e.g., program instructions) out of the memory 112, a computer program product can be configured to deliver some or all of the program instructions stored or maintained on the memory 112 to the storage processing circuitry 110. Such a computer program product can include one or more non-transient computer-readable storage media such as a magnetic disk, a magnetic tape, a compact disk (CD), a digital versatile disk (DVD), an optical disk, a flash drive, a solid-state drive (SSD), a secure digital (SD) chip or device, an application specific integrated circuit (ASIC), a field programmable gate array (FPGA), and so on. The non-transient computer-readable storage media can be encoded with sets of program instructions for performing, when executed by the storage processing circuitry 110, the various techniques and/or methods disclosed herein.

During operation, the storage system 104 can implement an adaptive approach to prefetching data for sequential read streams. The storage system 104 can perform prefetch operations for a sequential read stream in accordance with a prefetch distance and a prefetch size and count or otherwise keep track of occurrences of failure scenarios in the prefetch operations while servicing the sequential read streams. Based on the occurrences of the respective failure scenarios, the storage system 104 can dynamically modify or adjust one of the prefetch distance and the prefetch size for subsequent prefetch operations. In this way, host IO latency can be reduced, and IO bandwidth can be increased, in the servicing of sequential read streams by the storage system 104.

Figure 3:
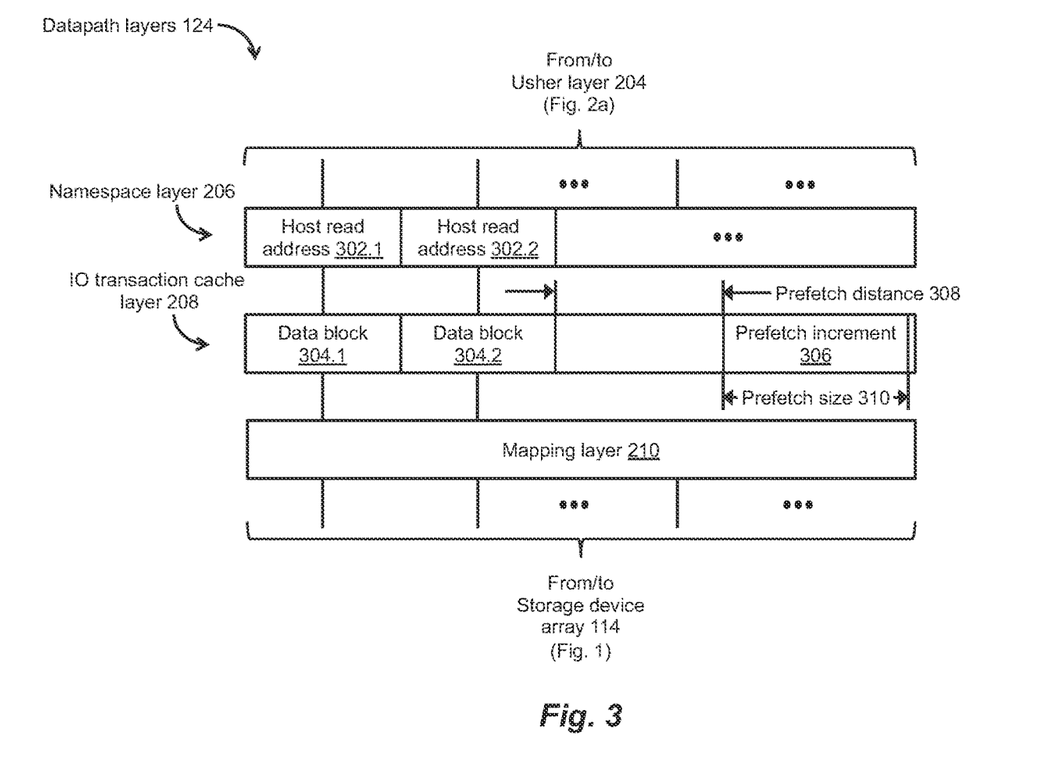
FIG. 3 is a block diagram of the namespace layer, the IO transaction cache layer, and the mapping layer of FIG. 2, in which an exemplary prefetch distance, an exemplary prefetch increment, and an exemplary prefetch size are illustrated in relation to the IO transaction cache layer.

The disclosed techniques will be further understood with reference to the following illustrative example and FIGS. 1-3. In this example, the failure scenarios in the prefetch operations performed by the storage system 104 (see FIG. 1) include a first failure scenario referred to herein as the "host-fast scenario" and a second failure scenario referred to herein as the "wasted-prefetch scenario." In the host-fast scenario, a host-generated read request ("host read") is directed to data residing at the same address from which data is actively being prefetched. In other words, the host read effectively "catches up" with the prefetch operation, thereby making the prefetch operation superfluous. In the wasted-prefetch scenario, prefetched data is evicted from the IO transaction cache layer 208 before being accessed to service a host read, thereby requiring the data to be accessed again to ultimately service the host read. Such failure scenarios in prefetch operations not only can increase host IO latency but also increase the use of storage system resources and/or drive bandwidth.

In this example, the storage system 104 receives a plurality of host-generated read requests ("host reads") for data stored on an extent of a volume, which is maintained on at least one storage device 126 of the storage device array 114. As shown in FIG. 3, a first host read and a second host read are directed to data residing at a host read address 302.1 and a host read address 302.2, respectively, each of which corresponds to an LBA of the extent. In this example, the first host read is directed to a data block 304.1, which is read from the extent on the storage device array 114 to the mapping layer 210 and subsequently transferred from the mapping layer 210 to the IO transaction cache layer 208. Similarly, a second host read is directed to a data block 304.2, which is read from the extent on the storage device array 114 to the mapping layer 210 and subsequently transferred from the mapping layer 210 to the IO transaction cache layer 208. In response to receiving the first and second host reads at the storage system 104, the storage processing circuitry 110 stores information pertaining to the host read addresses 302.1, 302.2 as entries in the history array 118. In addition, the stream detector 116 scans the entries of the history array 118 and, based at least on the information pertaining to the host read addresses 302.1, 302.2, detects or determines that the first and second host reads are part of a sequential read stream. In other words, the stream detector 116 detects or determines that the first and second host reads are directed to data blocks residing at sequential addresses in a given address space of the extent.

In response to determining that the first and second host reads are part of a sequential read stream, the storage processing circuitry 110 instantiates and allocates a stream tracker 122 from among the plurality of stream trackers 122 in the stream tracker pool 120 to manage prefetch functionality of the storage system 104 in the service of the sequential read stream. Based on an average IO size of the host reads, the stream tracker 122 determines an initial value of a prefetch size 310 (see FIG. 3) between a predetermined minimum size value and a predetermined maximum size value, as well as an initial value of a prefetch distance 308 (see FIG. 3) between a predetermined minimum distance value and a predetermined maximum distance value. The prefetch size 310, which corresponds to the size of a prefetch increment 306, specifies how much data will be prefetched starting at an address of the storage location referenced by the prefetch operation. In this example, if the average IO size of the host reads is 32 kilobytes (kb), then the initial value of the prefetch size 310 can be N*32 kb, in which "N" corresponds to any suitable positive integer value. For example, if the value "N" equals 32, then the initial value of the prefetch size 310 can be equal to 32*32 kb or 1 Mb. Further, the predetermined minimum size value can be equal to twice the average IO size, e.g., 2*32 kb or 64 kb, or any other suitable value. The prefetch distance 308 specifies how far ahead, in terms of addresses, a prefetch operation performed by the storage system 104 will reference a storage location of the extent compared to a prior host read of the extent. As shown in FIG. 3, the prefetch distance 308 is illustrated relative to the storage location of the data block 304.2 in the IO transaction cache layer 208. It is noted that the prefetch distance 308 can be expressed in terms of the amount of data residing in a range of addresses from a prior host read to the storage location referenced by the prefetch operation. In this example, the predetermined minimum distance value can be equal to 1 Mb or any other suitable value, and the predetermined maximum distance value can be equal to 24 Mb or any other suitable value.

Having determined initial values for the prefetch distance 308 and the prefetch size 310, the storage processing circuitry 110 performs prefetch operations for the sequential read stream. To that end, the storage processing circuitry 110 completes servicing of the most recent host read and causes a prefetch request (including information pertaining to the prefetch distance 308 and the prefetch size 310) to be generated at the frontend layer 202 (see FIG. 2) and issued from the usher layer 204 (see FIG. 2). In response to the prefetch request, 1 Mb of prefetched data (e.g., at 4 kb granularity) are read from the extent to the mapping layer 210 and transferred from the mapping layer 210 to the IO transaction cache layer 208 for caching or storage within the prefetch increment 306. During performance of the prefetch operations, the stream tracker 122 counts or otherwise keeps track of occurrences of failure scenarios in the prefetch operations (such as the host-fast scenario and the wasted-prefetch scenario) while servicing the sequential read stream.

If the host-fast scenario occurs at least once while servicing the sequential read stream (e.g., based on the count for the host-fast scenario), then the stream tracker 122 determines (i) whether a current value of the prefetch distance 308 is less than the predetermined maximum distance value (e.g., <24 Mb) or greater than or equal to the predetermined maximum distance value (e.g., 24 Mb), and (ii) whether a current value of the prefetch size 310 is greater than the predetermined minimum size value (e.g., >64 kb) or less than or equal to the predetermined minimum size value (e.g., ≤64 kb). Based on these determinations, the stream tracker 122 may reduce occurrences of the host-fast scenario by either (i) increasing the value of the prefetch distance 308 if its current value is less than the predetermined maximum distance value, or (ii) decreasing the value of the prefetch size 310 if the current value of the prefetch distance 308 is greater than or equal to the predetermined maximum distance value and the current value of the prefetch size 310 is greater than the predetermined minimum size value. For example, the prefetch distance 308 can be increased in increments of 64 kb or any other suitable amount. Further, the prefetch size 310 can be decreased in increments of 16 kb or any other suitable amount. However, if the current value of the prefetch distance 308 is determined to be greater than or equal to the predetermined maximum distance value (e.g., 24 Mb) and the current value of the prefetch size 310 is determined to be less than or equal to the predetermined minimum size value (e.g., ≤64 kb), then the stream tracker 122 causes the storage processing circuitry 110 to pause the prefetching operations at least temporarily. If prefetching operations are paused but sequential read streams continue to be detected, then the storage processing circuitry 110 can wait a predetermined period of time (e.g., one or several seconds), reinitialize the prefetch distance 308 and the prefetch size 310, and resume prefetch operations.

If the wasted-prefetch scenario occurs at least once (or preferably more than once) while servicing the sequential read stream (e.g., based on the count for the wasted-prefetch scenario), then the stream tracker 122 further determines whether the current value of the prefetch distance 308 is greater than the predetermined minimum distance value (e.g., >1 Mb) or less than or equal to the predetermined minimum distance value (e.g., ≤1 Mb). Based on this further determination, the stream tracker 122 may reduce occurrences of the wasted-prefetch scenario by decreasing the value of the prefetch distance 308 if its current value is determined to be greater (e.g., >1 Mb) than the predetermined minimum distance value. Further, if the current value of the prefetch distance 308 is determined to be less than or equal to the predetermined minimum distance value (e.g., ≤1 Mb) and the current value of the prefetch size 310 is determined to be less than or equal to the predetermined minimum size value (e.g., ≤64 kb), then the stream tracker 122 again causes the storage processing circuitry 110 to pause the prefetching operations. If prefetching operations are paused but sequential read streams continue to be detected, then the storage processing circuitry 110 can wait a predetermined period of time (e.g., one or several seconds) and reinitialize the prefetch distance 308 and the prefetch size 310 for subsequent prefetch operations.

In this example, each block of prefetched data (e.g., at 4 kb granularity) stored or cached in the IO transaction cache layer 208 within the prefetch increment 306 has a plurality of associated flags, namely, a PREFETCHED flag and a REPROMOTED flag. Further, the storage system 104 employs a least-recently-used (LRU) cache management technique to determine whether data blocks (e.g., prefetched or non-prefetched data blocks) can be retained in or evicted from the JO transaction cache layer 208. For each prefetched data block stored or cached in the JO transaction cache layer 208, the storage processing circuitry 110 sets its associated PREFETCHED flag, clears its associated REPROMOTED flag, and places an entry for the prefetched data block in an LRU queue implemented in the memory 112. In response to the prefetched data block being accessed to service a host read, the storage processing circuitry 110 clears its associated PREFETCHED flag and moves the entry for the prefetched data block to the head of the LRU queue. Further, the storage processing circuitry 110 periodically polls the LRU queue to determine whether a data block (e.g., prefetched or non-prefetched data block) whose entry has reached the head of the LRU queue can be retained or evicted from the JO transaction cache layer 208.

In response to an entry for a prefetched data block reaching the head of the LRU queue, the storage processing circuitry 110 determines whether the REPROMOTED flag associated with the prefetched data block is cleared or set. If the REPROMOTED flag associated with the prefetched data block is determined to be cleared, then the storage processing circuitry 110 sets the REPROMOTED flag, moves the entry for the prefetched data block to the tail of the LRU queue, increments or increases a count for the wasted-prefetch scenario, and retains the prefetched data block in the JO transaction cache layer 208. If the REPROMOTED flag associated with the prefetched data block is determined to be set, then the storage processing circuitry 110 removes the entry for the prefetched data block from the LRU queue, evicts the prefetched data block from the IO transaction cache layer 208, and increments or increases the count for the wasted-prefetch scenario. The stream tracker 122 may take into consideration this incremented or increased count when engaging in further activities related to reducing occurrences of the wasted-prefetch scenario.

Figure 4:
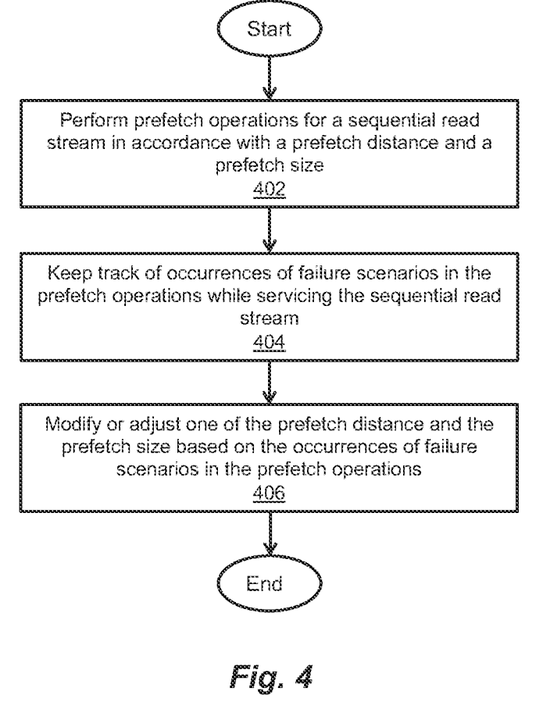
FIG. 4 is a flow diagram of an exemplary method of providing an adaptive approach to prefetching data for sequential read streams in a storage system.

An exemplary method of providing an adaptive approach to prefetching data for sequential read streams in a storage system is described below with reference to FIG. 4. As depicted in block 402, prefetch operations are performed for a sequential read stream in accordance with a prefetch distance and a prefetch size. As depicted in block 404, occurrences of failure scenarios in the prefetch operations are counted or otherwise kept track of while servicing the sequential read stream. As depicted in block 406, one of the prefetch distance and the prefetch size is modified or adjusted based on the occurrences of failure scenarios in the prefetch operations. In this way, host IO latency can be reduced, and IO bandwidth can be increased, in the servicing of sequential read streams by the storage system.

Having described the above illustrative embodiments, other alternative embodiments and/or variations can be made and/or practiced. For example, it was described herein that, if the wasted-prefetch scenario occurs at least once (or preferably more than once) while servicing a sequential read stream, then occurrences of the wasted-prefetch scenario may be reduced by decreasing the prefetch distance. In an alternative embodiment, a stream tracker for the sequential read stream can maintain a count of occurrences of the wasted-prefetch scenario while servicing the sequential read stream and compare the count to a threshold value such as three (3) or any other suitable value. If the count of occurrences of the wasted-prefetch scenario is determined to meet or exceed the threshold value, then the stream tracker can perform actions such as decreasing the prefetch distance to reduce further occurrences of the wasted-prefetch scenario.

It was also described herein that a stream tracker may reduce occurrences of the host-fast scenario by increasing the prefetch distance and may reduce occurrences of the wasted-prefetch scenario by decreasing the prefetch distance. Based on relative frequencies of occurrence of the host-fast and wasted-prefetch scenarios, such alternate increasing and decreasing of the prefetch distance can create an undesirable "ping-pong" effect. In this case, the stream tracker can cause the storage processing circuitry to pause prefetching operations at least temporarily. Further, if prefetching operations are paused but sequential read streams continue to be detected, then the storage processing circuitry can wait a predetermined period of time (e.g., one or several seconds), reinitialize the prefetch distance (as well as the prefetch size), and resume prefetch operations.

It was also described herein that the history array can include a plurality of entries for maintaining a history of the most recent data accesses made to service host reads in a sequential read stream. In cases where the storage system is configured as an active-active system, a peer access lock table may be provided to control access to storage objects maintained on the storage device array. In such cases, the history array can be piggybacked with the per access lock table to enhance look-up efficiency in the active-active system.

Several definitions of terms are provided below for the purpose of aiding the understanding of the foregoing description, as well as the claims set forth herein.

As employed herein, the term "storage system" is intended to be broadly construed to encompass, for example, private or public cloud computing systems for storing data, as well as systems for storing data comprising virtual infrastructure and those not comprising virtual infrastructure.

As employed herein, the terms "client," "host," and "user" refer, interchangeably, to any person, system, or other entity that uses a storage system to read/write data.

As employed herein, the term "storage device" may refer to a storage array including multiple storage devices. Such a storage device may refer to any non-volatile memory (NVM) device including hard disk drives (HDDs), solid state drives (SSDs), flash devices (e.g., NAND flash devices, NOR flash devices), and/or similar devices that may be accessed locally and/or remotely (e.g., via a storage attached network (SAN)). A storage array (drive array, disk array) may refer to a data storage system used for block-based, file-based, or object storage. Storage arrays can include, for example, dedicated storage hardware containing HDDs, SSDs, and/or all-flash drives. A data storage entity may be any one or more of a filesystem, an object storage, a virtualized device, a logical unit (LU), a logical unit number (LUN), a volume (VOL), a logical volume (LV), a logical device, a physical device, and/or a storage medium. An LU may be a logical entity provided by a storage system for accessing data from the storage system and may be used interchangeably with a logical volume. An LU or LUN may be used interchangeably with each other. A LUN may be a logical unit number for identifying an LU and may also refer to one or more virtual disks or virtual LUNs, which may correspond to one or more virtual machines. A physical storage unit may be a physical entity such as a drive, a disk, or an array of drives or disks for storing data in storage locations that can be accessed by addresses. A physical storage unit may be used interchangeably with a physical volume.

As employed herein, the term "storage medium" may refer to one or more storage media such as a hard drive, a combination of hard drives, flash storage, a combination of flash storages, a combination of hard drives, flash storage, and other storage devices, or any other suitable types or combinations of computer readable storage media. A storage medium may also refer to both physical and logical storage media, include multiple levels of virtual-to-physical mappings, and include an image or disk image. A storage medium may be computer-readable and may be referred to as a computer-readable program medium.

As employed herein, the term "TO request" or simply "TO" may be used to refer to an input or output request such as a data read request or data write request.

As employed herein, the terms, "such as," "for example," "e.g.," "exemplary," and variants thereof describe non-limiting embodiments and mean "serving as an example, instance, or illustration." Any embodiments described herein using such phrases and/or variants are not necessarily to be construed as preferred or more advantageous over other embodiments, or to exclude the incorporation of features from other embodiments. In addition, the term "optionally" is employed herein to mean that a feature or process, etc., is provided in certain embodiments and not provided in other embodiments. Any embodiment of the present disclosure may include a plurality of "optional" features unless such features conflict with one another.

While various embodiments of the present disclosure have been particularly shown and described, it will be understood by those skilled in the art that various changes in form and details may be made therein without departing from the scope of the present disclosure, as defined by the appended claims.

What is claimed is:

1. A method of prefetching data for a sequential read stream, comprising:
   performing prefetch operations for a sequential read stream in accordance with a prefetch distance and a prefetch size;
   keeping track of occurrences of failure scenarios in the prefetch operations while servicing the sequential read stream;
   dynamically adjusting one of the prefetch distance and the prefetch size based on the occurrences of failure scenarios in the prefetch operations;
   receiving a plurality of read requests for data stored on a storage object;
   determining that the plurality of read requests are part of the sequential read stream; and
   determining an initial value of the prefetch size based on an average input/output (IO) size of the plurality of read requests, the initial value of the prefetch size being greater than a predetermined minimum size value.

2. The method of claim 1 wherein the plurality of read requests reference addresses of the storage object, and wherein the method further comprises:
   storing information pertaining to the addresses referenced by the plurality of read requests as entries in a history array,
   wherein determining that the plurality of read requests are part of the sequential read stream includes scanning the entries of the history array.

3. The method of claim 1 further comprising:
   determining an initial value of the prefetch distance based on the average IO size of the plurality of read requests, the initial value of the prefetch distance being between a predetermined minimum distance value and a predetermined maximum distance value.

4. The method of claim 3 wherein the failure scenarios include a host-fast scenario, wherein the host-fast scenario includes a respective read request being directed to data residing at the same address from which data is actively being prefetched, and wherein keeping track of occurrences of failure scenarios includes determining whether the host-fast scenario occurs at least once while servicing the sequential read stream.

5. The method of claim 4 further comprising:
   in response to determining that the host-fast scenario occurs at least once while servicing the sequential read stream, determining that a current value of the prefetch distance is less than the predetermined maximum distance value,
   wherein dynamically adjusting the prefetch distance includes increasing the value of the prefetch distance to reduce occurrences of the host-fast scenario.

6. The method of claim 4 further comprising:
   in response to determining that the host-fast scenario occurs at least once while servicing the sequential read stream, determining that a current value of the prefetch distance is greater than or equal to the predetermined maximum distance value, and determining that a current value of the prefetch size is greater than the predetermined minimum size value,
   wherein dynamically adjusting the prefetch size includes decreasing the value of the prefetch size to reduce occurrences of the host-fast scenario.

7. The method of claim 3 wherein the failure scenarios include a wasted-prefetch scenario, wherein the wasted-prefetch scenario includes prefetched data being evicted from a cache memory before being accessed to service a respective read request, and wherein keeping track of occurrences of failure scenarios includes determining whether the wasted-prefetch scenario occurs at least once while servicing the sequential read stream.

8. The method of claim 7 further comprising:
   in response to determining that the wasted-prefetch scenario occurs at least once while servicing the sequential read stream, determining that a current value of the prefetch distance is greater than the predetermined minimum distance value,
wherein dynamically adjusting the prefetch distance includes decreasing the value of the prefetch distance to reduce occurrences of the wasted-prefetch scenario.

9. The method of claim 1 wherein performing prefetch operations for a sequential read stream includes storing prefetched data elements in a cache memory.

10. The method of claim 9 wherein each prefetched data element stored in the cache memory has a plurality of associated flags including a PREFETCHED flag and a REPROMOTED flag, and wherein the method further comprises:
for each prefetched data element stored in the cache memory, setting its associated PREFETCHED flag, clearing its associated REPROMOTED flag, and placing an entry for the prefetched data element in a least-recently-used (LRU) queue.

11. The method of claim 10 further comprising:
in response to the prefetched data element being accessed to service a read request, clearing its associated PREFETCHED flag, and moving the entry for the prefetched data element to a head of the LRU queue.

12. The method of claim 10 further comprising:
in response to the entry for the prefetched data element reaching a head of the LRU queue, determining that the REPROMOTED flag associated with the prefetched data element is set, removing the entry for the prefetched data element from the LRU queue, and evicting the prefetched data element from the cache memory.

13. The method of claim 10 further comprising:
in response to the entry for the prefetched data element reaching a head of the LRU queue, determining that the REPROMOTED flag associated with the prefetched data element is cleared, setting the REPROMOTED flag associated with the prefetched data element, moving the entry for the prefetched data element to a tail of the LRU queue, and retaining the prefetched data element in the cache memory.

14. A system for prefetching data for a sequential read stream, comprising:
a main memory; and
processing circuitry configured to execute program instructions out of the main memory to:
perform prefetch operations for a sequential read stream in accordance with a prefetch distance and a prefetch size;
keep track of occurrences of failure scenarios in the prefetch operations while servicing the sequential read stream;
dynamically adjust one of the prefetch distance and the prefetch size based on the occurrences of failure scenarios in the prefetch operations;
receive a plurality of read requests for data stored on a storage object;
determine that the plurality of read requests are part of the sequential read stream; and
determine an initial value of the prefetch size based on an average input/output (IO) size of the plurality of read requests,
wherein the initial value of the prefetch size is greater than a predetermined minimum size value.

15. The system of claim 14 further comprising a history array, wherein the processing circuitry is further configured to execute the program instructions out of the main memory to store information pertaining to addresses referenced by the plurality of read requests as entries in the history array, and scan the entries of the history array to determine that the plurality of read requests are part of the sequential read stream.

16. The system of claim 14 further comprising a cache memory, wherein the failure scenarios include a host-fast scenario and a wasted-prefetch scenario, and wherein the processing circuitry is further configured to execute the program instructions out of the main memory to determine an initial value of the prefetch distance based on the average IO size of the plurality of read requests, wherein the host-fast scenario includes a respective read request being directed to data residing at the same address from which data is actively being prefetched, and wherein the wasted-prefetch scenario includes prefetched data being evicted from the cache memory before being accessed to service a respective read request.

17. A computer program product including a set of non-transitory, computer-readable media having instructions that, when executed by processing circuitry of a computerized apparatus, cause the processing circuitry to perform a method of prefetching data for a sequential read stream, the method comprising:
performing prefetch operations for a sequential read stream in accordance with a prefetch distance and a prefetch size;
keeping track of occurrences of failure scenarios in the prefetch operations while servicing the sequential read stream;
dynamically adjusting one of the prefetch distance and the prefetch size based on the occurrences of failure scenarios in the prefetch operations,
wherein performing prefetch operations for a sequential read stream includes storing prefetched data elements in a cache memory, and
wherein each prefetched data element stored in the cache memory has a plurality of associated flags including a PREFETCHED flag and a REPROMOTED flag; and
for each prefetched data element stored in the cache memory, setting its associated PREFETCHED flag, clearing its associated REPROMOTED flag, and placing an entry for the prefetched data element in a least-recently-used (LRU) queue.

18. The computer program product of claim 17 wherein the method further comprises:
in response to the entry for the prefetched data element reaching a head of the LRU queue, determining that the REPROMOTED flag associated with the prefetched data element is cleared, setting the REPROMOTED flag associated with the prefetched data element, moving the entry for the prefetched data element to a tail of the LRU queue, and retaining the prefetched data element in the cache memory.

* * * * *